(12) United States Patent
Simons

(10) Patent No.: US 9,084,513 B2
(45) Date of Patent: Jul. 21, 2015

(54) METHOD AND APPARATUS FOR TAMPING AND SCRAPING

(71) Applicant: Jonathan Simons, Kempton, PA (US)

(72) Inventor: Jonathan Simons, Kempton, PA (US)

(*) Notice: Subject to any disclaimer, the term of this patent is extended or adjusted under 35 U.S.C. 154(b) by 241 days.

(21) Appl. No.: 13/836,750

(22) Filed: Mar. 15, 2013

(65) Prior Publication Data

US 2013/0255001 A1    Oct. 3, 2013

Related U.S. Application Data

(60) Provisional application No. 61/617,772, filed on Mar. 30, 2012.

(51) Int. Cl.
*A47J 43/28* (2006.01)

(52) U.S. Cl.
CPC ..................................... *A47J 43/288* (2013.01)

(58) Field of Classification Search
CPC ........ A47J 43/28; A47J 43/288; A47L 13/08; A47L 17/06; A47L 13/02; A47L 13/022
USPC ......................... 7/110, 11; 15/236.01, 236.07
See application file for complete search history.

(56) References Cited

U.S. PATENT DOCUMENTS

| | | | |
|---|---|---|---|
| 3,346,029 A | 10/1967 | Harris, Jr. | |
| 3,373,975 A | 3/1968 | Congdon | |
| 4,355,432 A * | 10/1982 | Storm, Jr. | 15/236.07 |
| 5,033,156 A | 7/1991 | Stewart | |
| 5,491,862 A | 2/1996 | Hurley | |
| 5,799,997 A * | 9/1998 | Lehn et al. | 15/236.07 |
| D405,661 S | 2/1999 | Erickson | |
| 6,012,227 A | 1/2000 | Lent | |
| D531,865 S * | 11/2006 | Lambertson, Jr. | D8/45 |
| 8,501,114 B1 * | 8/2013 | Charman | 422/500 |
| D707,088 S * | 6/2014 | Schugart | D7/688 |
| 2004/0231087 A1 | 11/2004 | Siegel et al. | |

OTHER PUBLICATIONS

International Search Report received in corresponding PCT/US2013/032193, dated Jun. 20, 2013.
KaTom RS, Robot Coupe CL50 Ultra Food Processor Demonstration: YouTube, Oct. 17, 2011, retrieved from internet Jun. 6, 2013, http://www.youtube.com/watch?v=GC_22Fqqzfc.

* cited by examiner

*Primary Examiner* — Hadi Shakeri
(74) *Attorney, Agent, or Firm* — Edell, Shapiro & Finnan, LLC

(57) ABSTRACT

A tamping and scraping tool for a food processor includes a flat blade in the form of a segment of a circle and a handle extending perpendicularly therefrom. The blade has an arcuate circumferential scraping edge and a chordal scraping edge interrupted by a central arcuate recess configured as a smaller circle segment. The flat bottom surface serves as a tamping surface; the chordal scraping edge permits scraping material from the bottom wall of the processor; and the outer scraping edge permits scraping of material from the processor sidewall.

17 Claims, 3 Drawing Sheets

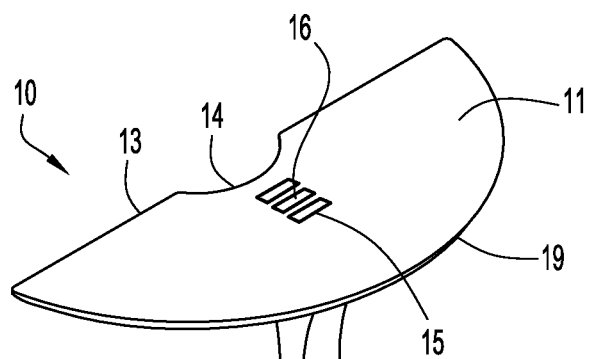
FIG.1
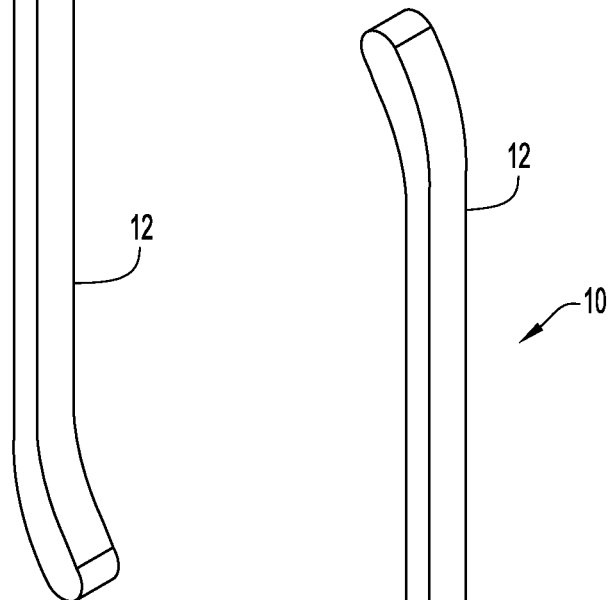
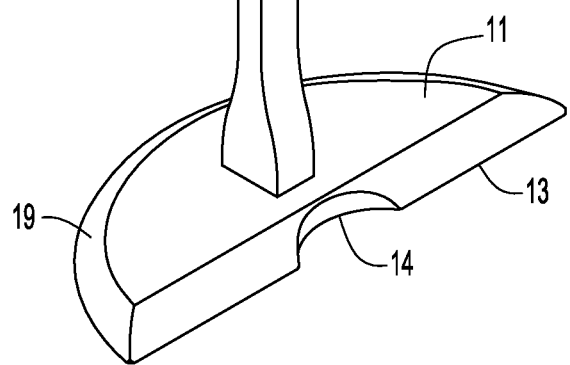
FIG.2

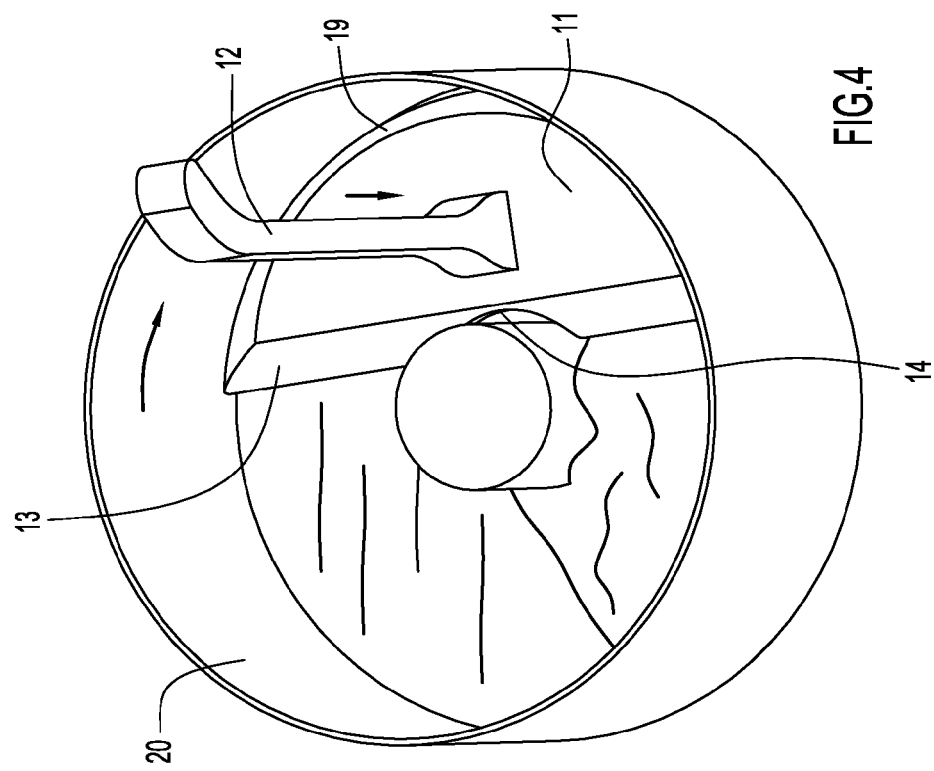
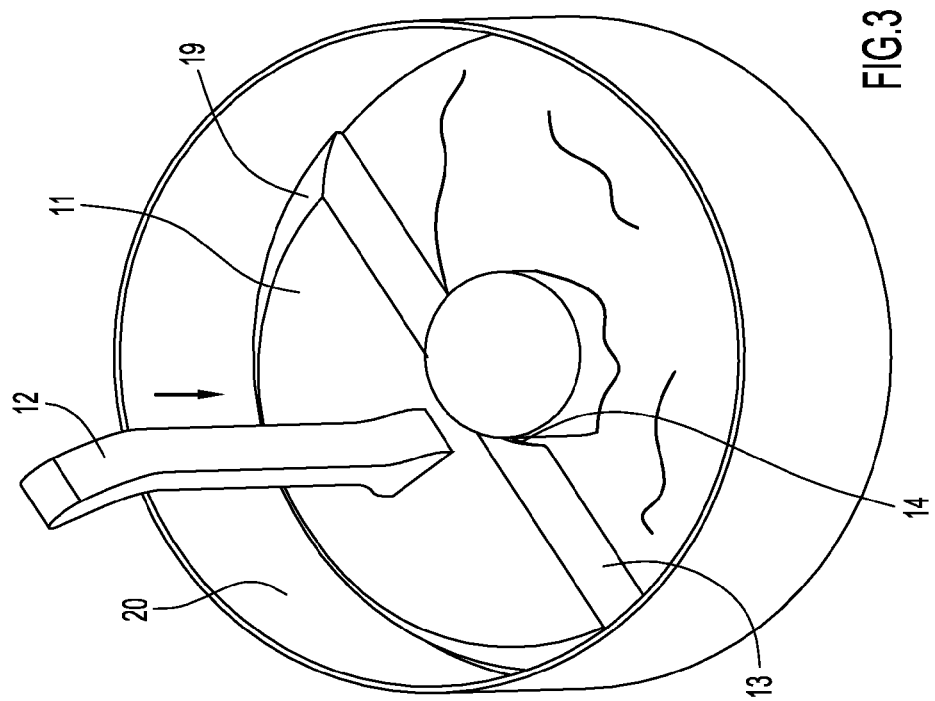

METHOD AND APPARATUS FOR TAMPING AND SCRAPING

CROSS REFERENCE TO RELATED APPLICATIONS

This application is a non-provisional application based on U.S. Provisional Application No. Ser. No. 61/617,772, filed Mar. 30, 2012 and entitled "Method And Apparatus For Tamping And Scraping", the disclosure of which is hereby incorporated by reference in its entirety.

FIELD OF THE INVENTION

The present invention pertains to a tamping and scraping tool for use with food processors, blenders and similar type of machines in which a rotating implement chops, purees or otherwise de-structures food items and materials.

BACKGROUND OF THE INVENTION

During operation of a food processor in its various modes of destructuring food items there is a tendency of the cut or chopped food pieces, or the fluidized food item(s), to collect unevenly, particularly along the interior peripheral wall (and sometimes on the bottom wall) of the processor chamber at locations that are out of reach of the rotating blade. As a result the processing operation can be uneven and/or take longer to complete. In order to overcome this problem some users of food processors will turn the processor off, remove the chamber cover, and attempt to consolidate or re-position the food items with a spoon or other common kitchen utensil. The shapes of such utensils are less than ideal for this function, thereby rendering the consolidation process time consuming and unwieldy. In addition, the central blade-mounting post in the food processor complicates utensil access to the processor contents. It is therefore desirable to provide a tamping tool that permits the operator to quickly and effectively consolidate the food pieces to permit efficient de-structuring by the processor.

Upon removal of de-structured food pieces or fluidized food items from a food processor, some of the fluids or pieces do not readily pour out of the chamber and must be scraped from the interior bottom and side chamber walls. Again, operators tend to do this with common kitchen utensils which are inefficiently configured for this function. Here, too, the central post in the processor chamber presents a problem by impeding access of the utensil to all of the food residue. Therefore, it is desirable to provide a scraper tool that is capable of quickly and efficiently scraping and removing residue food pieces and fluidized food from the bottom and side walls food processor chamber.

It is even more desirable to provide a single tool configured to efficiently provide both a tamping and scraping capability for manipulating the contents of a food processor chamber.

Another disadvantage of common kitchen utensils when used to tamp or scrape food in a food processor chamber relates to the configuration of the utensil handle. Specifically, the working head of the utensil must be moved vertically and rotationally to effect the tamping and scraping operations. A straight handle, as is typically provided on the utensil, requires undue manipulation of the operator's wrist or arm in effecting the necessary tamping or scraping movement of the head. In addition, thin handles of circular or polygonal configuration tend to rotate in a user's hand when the distal end of the utensil encounters resistance to rotation.

Thus, it would be desirable to provide a single tool configured, as described above, having a handle configured to overcome these disadvantages.

SUMMARY OF THE INVENTION

In accordance with a preferred embodiment of the present invention a tamping and scraping tool for a food processor includes a flat plate or blade in the form of a segment of a circle from which a handle extends perpendicularly from a top surface. The blade has an arcuate circumferential scraping edge with a radius of curvature that is generally similar, if not identical, to that of the interior wall of the food processor. A chordal scraping edge of the blade is configured as a substantially straight line extending from opposite ends of the outer arcuate scraping edge and interrupted at its midpoint by an arcuate recess configured as a smaller circle segment to accommodate and abut a corresponding arcuate portion of the circumferential surface of a central post of the food processor. The recess prevents the post from interfering with rotational tool blade movement in the food processor chamber and, further, acts as a lateral stabilizing guide to facilitate such rotation and other positioning of the blade. The bottom or distal surface of the blade is substantially flat and planar and serves as a tamping surface against the contents of the food processor chamber. The arcuate peripheral edge tapers in thickness in a radially outward direction, thereby forming a substantially arcuate thin scraping edge to permit chamber contents to be easily scraped from the interior surface of the chamber sidewall with axially proximal (i.e., outwardly of the food processor) strokes of the tool. During axially distal strokes (i.e., inwardly in the chamber) the scraped material can be pushed downward against the chamber bottom for consolidation during tamping. The two sections of chordal edge of the blade on each side of the recess also taper in thickness toward the bottom surface to provide interior or chordal scraping edge sections to permit chamber contents to be scraped from the bottom wall of the chamber with rotation of the blade about the axis of the chamber post in either rotational direction.

The arcuate peripheral edge of the blade preferably has a radius of curvature substantially equal to, or just minimally smaller than, that of the interior surface of the cylindrical sidewall of the food processor chamber in which the blade is used. The radius of curvature of the arcuate recess in the chordal edge of the blade preferably has a radius of curvature substantially equal to or slightly greater than that of the outer cylindrical surface of the center post in the food processor chamber. The circle of which the arcuate peripheral edge is a segment, and the circle of which the arcuate recess in the chordal edge is a segment, are preferably concentric.

The circle segment forming the tool blade is, in one preferred embodiment, smaller than a semicircle to permit the tool blade to be inserted perpendicularly into a food processor chamber during a tamping operation without interference from a conventional S-shaped food processor cutting blade that can then remain mounted on the chamber center post during tamping.

The handle distal end is secured to a substantially central location of the tool blade radially spaced from the arcuate recess in the interior chordal edge. The handle has a constant generally rectangular cross-section throughout most of its length, broadening at its proximal and distal ends. At its proximal end the handle is provided with a curvature to more readily fit an operator's hand and thereby facilitate both rotational and axial scraping action while resisting turning of the handle in the hand.

The configuration of the blade as a circle segment (i.e., defined between a portion of the circumference of a circle and a chord of the circle), as opposed to a circle sector (i.e., defined between a portion of the circumference of a circle and two radii of the circle), is an important feature of the invention. For example, a scraper tool with a pie-shaped (i.e., sector shaped) blade is disclosed U.S. Pat. No. 6,012,227 (Lent) wherein the interior scraping edges are radial as opposed to chordal, and the handle is secured to the blade at the radially innermost point of the blade. The mechanical advantage achieved at the radial scraping edge is considerably less than in the present invention where the interior scraping edge is chordal and the handle is attached to the blade radially outward from that edge.

Thus, in one aspect of the present invention a tamping and scraping tool for use in moving food in a food processor comprises a scraper plate in the form of a segment of a circle and having an inner scraping edge configured as a substantially straight chordal line centrally interrupted by an arcuate recess with a small radius of curvature about the central longitudinal axis of the food processor chamber, an outer arcuate scraping edge with a larger radius of curvature about the central axis of the food processor chamber, and a handle joined in substantially perpendicular orientation to the plate at a location radially outward of the arcuate recess and inward of the outer arcuate edge.

In another aspect of the invention the plate has a flat and substantially planar bottom surface.

In still another aspect of the invention the tool is designed for use with a food processor having a processing chamber with a cylindrical outer wall having a prescribed curvature, wherein the radius of curvature of the tool outer edge matches the curvature of the chamber outer wall.

In still another aspect of the invention the food processor chamber has an axially centered cylindrical post with an arcuate outer surface, wherein the arcuate recess in the inner edge of the plate is contoured to match the arcuate outer surface of the post.

In a further aspect of the invention the inner and outer edges of the plate are tapered to define scraper blade edges.

In another aspect of the invention the arcuate recess and arcuate outer edge are parts of concentric circles.

In yet a further aspect of the invention the tool handle includes a widened bend at its proximal end serving as a large surface grip to facilitate turning and pulling of the tool and to resist rotation of the handle in a user's hand during scraping.

In another aspect of the invention the tool plate is sized and configured to permit the tool blade to be inserted in an axial direction into a food processor chamber during a tamping operation without interference from an S-shaped food processor cutting blade.

In a further aspect of the invention the circle segment shape of the plate encompasses an angle of between 140° and 170°.

The above and still further features and advantages of the present invention will become apparent upon consideration of the definitions, descriptions and descriptive figures of specific embodiments thereof set forth herein. In the detailed description below, like reference numerals in the various figures are utilized to designate like components and elements, and like terms are used to refer to similar or corresponding elements in the several embodiments. While these descriptions go into specific details of the invention, it should be understood that variations may and do exist and would be apparent to those skilled in the art in view of the following description.

BRIEF DESCRIPTION OF THE DRAWINGS

FIG. 1 is a bottom view in perspective of a preferred embodiment of a tool according to the present invention.

FIG. 2 is a top view in perspective of the embodiment of FIG. 1.

FIG. 3 is a top view in perspective of a food processor and the tool of FIG. 1 diagrammatically illustrating the tool being used in a tamping mode of operation.

FIG. 4 is a top view in perspective of a food processor and the tool of FIG. 1 diagrammatically illustrating the tool being used in a bottom wall scraping mode of operation.

DETAILED DESCRIPTION OF THE INVENTION

Figure 5:
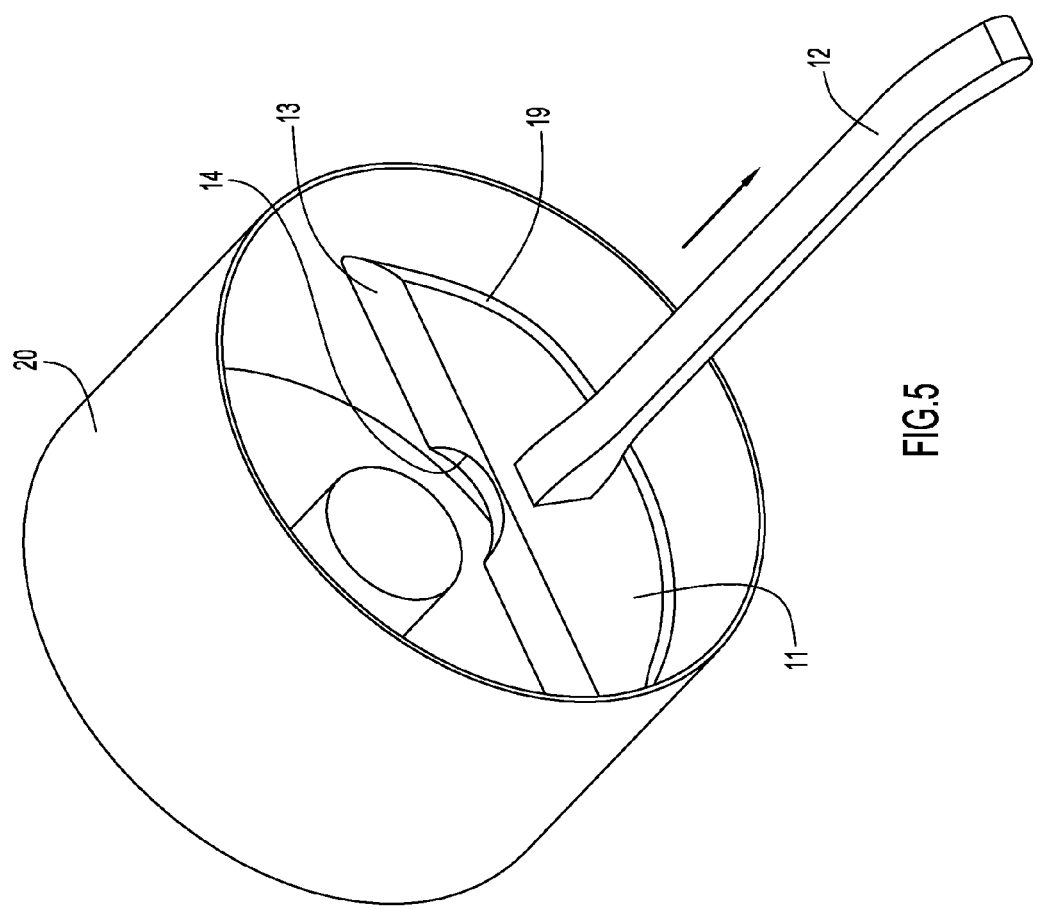
FIG. 5 is a top view in perspective of a food processor and the tool of FIG. 1 diagrammatically illustrating the tool being used in a sidewall scraping mode of operation.

Referring to the drawings in greater detail, the tool 10 of the present invention includes two parts, a blade 11 and a handle 12, joined in the manner described below. The parts are preferably made of wood but can also be made of metal or molded thermoplastic. Blade 11 is a plate-like member in the shape of a segment of a circle that can be approximately a semi-circle (i.e., encompassing 180°) but is preferably slightly smaller (i.e., encompassing an angle of between approximately 140° and 170°). In the preferred embodiment the blade segment encompasses an angle of approximately 155°. It is important to note that if the tool blade segment 11 is less than semi-circular, as in the preferred embodiment, the tool blade is capable of fitting in an interior chamber of a food processor 20 while an S-shaped processor cutting blade is still in place, thereby to effect tamping operations without the need for removing the processor cutting blade. The dimensions of the circle for which the blade forms a segment are determined by the dimensions of the annular interior wall surface of the chamber of the food processor 20. More particularly, the radius of curvature of the arcuate outer scraping edge 19 of blade segment 11 is equal to or slightly smaller than the radius of curvature of the interior wall of the chamber of the food processor 20.

The chordal edge 13 of the tool blade is a straight line interrupted by an arcuate recess 14 configured to match a sector of the outer surface of a blade-mounting post in a food processor 20. The circumferential angle subtended by recess 14 is determined by the circular area of the circle segment occupied by tool blade 11. Recess 14 essentially divides edge 13 into two spaced co-linear edge sections of substantially equal length. The radius of curvature of arcuate recess 14 is equal to or slightly larger than the radius of curvature of the central post in the food processor chamber 20 in which the tool 10 is to be used. The circles, of which arcuate recess 14 and the outer scraping edge 19 of blade 11 are segments, are concentric with one another about a point that resides on the central longitudinal axis of the food processor chamber 20 when the tool is in use. Stated otherwise, the arcs subtended by recess 14 and outer scraping edge 19 are defined about the same focus or center point of respective circles, the focus being located radially interiorly of both arc 14 and edge 19.

The bottom surface of tool blade 11 is substantially flat and planar, whereas the top surface is flat and is beveled at its edges except at recess 14. In other words these edges taper toward the edge of the bottom surface of the blade to form relatively thin scraping edges. The outer edge of the blade forms an arcuate scraping edge 19 matching a portion of the contour of the interior surface of the cylindrical wall of the food processor chamber 20 and occupying an angle corresponding to that of the blade segment. This arcuate scraping edge 19 permits efficient and effective scraping of food contents adhering to the food processor chamber sidewall when the blade is moved axially out of the chamber. The co-linear sections of inner chordal scraping edge 13 form straight scraping edges that permit food contents on the bottom wall in the chamber to be removed from or moved along that bottom wall by rotating the blade in either angular direction when the blade is proximate the bottom of the chamber.

Tool blade 11 is provided with a plurality of mortise apertures or through holes 15 extending between its top and bottom surfaces at locations spaced successively radially outward and radially outward from recess 14. Mortise apertures 15 have a polygonal cross-section which, in the preferred embodiment, is rectangular. The apertures 15 are located in radial alignment between recess 14 and edge 19 and closer to recess 14 than to edge 19.

Handle 12 has a distal end from which three tenon projections 16 extend in parallel relation in an axial direction of the handle. The cross-sections of the tenons 16 match the cross sections of respective mortise holes 15 so as to provide a tight fit engagement therebetween and a resulting strong joint connection between the handle and blade. If desired, a suitable adhesive may be used to enhance the connection. These mortise and tenon connections, because of the polygonal cross-sections, resist rotation of the handle relative to the blade, a feature that is advantageous during rotational scraping. The portion of the handle immediately proximate the distal end and the tenons is wider in the plane of the tenons than most of the length of the handle.

The proximal end of handle 12 widens gradually in the plane of the tenons 16. The widening is achieved by curving the radially outer side of the handle a small amount to enable the proximal end to fit in a person's hand and facilitate rotation of the handle. The curvature is in a direction that is radially outward relative to the plane of the blade (i.e., away from the central axis of the food processor chamber 20 when the tool is in use).

From the foregoing description and the drawings it will be appreciated that the handle distal end is joined to the blade at a location on the blade between recess 14 and edge 19 in radial alignment with the angular centers of the arcs subtended by that recess and edge. This location, closer to recess 14 than edge 19 but spaced radially outward from recess 14, permits ease of rotation of the blade by the user upon rotating his/her wrist with the handle grasped in the user's palm.

As shown diagrammatically in FIG. 3, the tool may be manually operated to provide a tamping function by moving the tool blade 11 down onto contents in a food processor chamber 20. As noted, this can be done by first removing the processor cutting blade or, if the tool blade segment 11 is less than semi-circular as described hereinabove for the preferred embodiments, by leaving an S-shaped processor cutting blade in place since it will not interfere with the tool blade movement in the chamber. In either case, for a tamping operation a user grabs the handle 12 at its proximal end and, by repeatedly pushing the bottom surface of the tool blade against the chamber contents the user can concentrate the food pieces and fluidized matter toward the chamber bottom where they can subsequently be more efficiently mixed, stirred pureed, etc., by the rotating cutting or chopping elements of the food processor 20. The blade 11 may be lifted periodically and rotated about the chamber center post to attain access to the contents at different angular locations in the chamber 20, thereby permitting the tamping process to be effected at each of these locations. Recess 14 receives an angular portion of the chamber center post circumference, and the arcuate outer edge 19 of the blade contacts the chamber sidewall, so that the blade is positionally stabilized laterally and can be easily rotated for this purpose. During this tamping operation, materials that have agglomerated on the sidewall of the processor chamber 20 are scraped off that wall and moved downward with the other concentrated matter.

Use of the tool to scrape contents from the bottom of the processor chamber 20 is diagrammatically illustrated in FIG. 4, an operation that is typically performed when removing the processed contents from the processor chamber. The bottom surface of the blade is placed atop the contents of the chamber with the arcuate recess 14 abutting the chamber center post and the blade outer edge 19 adjacent the chamber sidewall. The blade is pushed down while rotating it, either in one angular direction or back and forth, so that the two sections of blade edge 13 can scrape the chamber contents from the chamber bottom wall. In this manner the contents may be consolidated at one angular location in the chamber for easy removal while residing on the top surface of the blade. Again, stabilization of the blade between the center post and sidewall of the chamber facilitates accurate placement and smooth rotation of the blade in the chamber.

Scraping of the chamber sidewall is diagrammatically illustrated in FIG. 5. The arcuate outer scraping edge 19 of the blade is simply scraped upwardly along the chamber sidewall to scrape any materials that have agglomerated on the sidewall either downward or out through the open top of the chamber. Since the radii of curvature of the arcuate blade edge 19 and chamber sidewall are substantially the same, the outer blade edge is in full contact with the sidewall along the entire angular length of the blade and readily scrapes the material from the sidewall. The blade can be rotated to different angular positions about the chamber center post to permit scraping successive angular sectors of the chamber wall. The chamber center post is received in recess 14 of the blade 11 to provide lateral stabilization of the blade during rotation and scraping.

The widening and curvature at the proximal end of the handle provides for further stabilization of the tool during the operations described above. Specifically, if the cross-section of the handle were constant and cylindrical at the location residing in a user's hand, the handle would tend to turn or rotate about its axis in the user's hand if the blade encounters rotational resistance when moved in the chamber. The curved and widened proximal end of the handle, however, rests in the user's palm, proximally spaced from the roots of the fourth and fifth fingers, where it provides support in opposition to the turning moment relative to the hand.

In one embodiment of tool 10 that is suitable for use with several food processors currently being sold, blade 11 has a length of approximately 6 inches between opposite ends of chordal edge 13, and a width of approximately 2.5 inches between chordal edge 13 and the angular center of outer edge 19. In another embodiment for use with other commercially available food processors the length is approximately 4.5 inches and the width is approximately 1.9 inches. The blade typically has a thickness of approximately 0.25 inch. The handle as used with both of these embodiments has a length, from its proximal end to the distal ends of tenons 16, of approximately 9 inches. The transverse width of head or distal end of the handle is approximately 0.9 inch. These dimensions are provided as examples and are not to be construed as limiting the scope of the invention unless otherwise recited in the claims.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention that come within the scope of the appended claims and their equivalents. It is to be understood that terms such as "left", "right" "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

Having described preferred embodiments of new and improved method and apparatus for tamping and scraping, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

I claim:

1. A tamping and scraping tool for use in manipulating food materials in a food processor chamber having a central longitudinal axis, said tool comprising:
    a scraper plate in the form of a segment of a circle, said plate having a bottom tamping surface for tamping down food materials and an inner scraping edge configured as a substantially straight line coincident with a chord of said circle segment, said inner scraping edge being centrally interrupted by an arcuate recess with a small radius of curvature about the central longitudinal axis of the food processor chamber;
    an outer arcuate scraping edge with a larger radius of curvature about the central axis of the food processor chamber, said outer scraping edge being coincident with an arc of said circle segment; and
    a handle joined in substantially perpendicular orientation to the plate at a connection location spaced radially outward from the arcuate recess and inward of the outer arcuate edge.

2. The tool of claim 1,
    wherein the food processor chamber has an axially centered cylindrical post with an arcuate outer surface, and
    wherein said arcuate recess in the inner edge of the plate is contoured to match the arcuate outer surface of the post.

3. The tool of claim 1, wherein said arcuate recess and arcuate outer edge are parts of respective concentric circles.

4. The tool of claim 1, wherein the tool handle includes a widened bend at a proximal end serving as a large surface grip to facilitate turning and pulling of the tool and to resist rotation of the handle in a user's hand during scraping.

5. The tool of claim 1,
    wherein the food processor chamber has an axially centered cylindrical post, and
    wherein the tool is sized and configured to permit said plate to be inserted in an axial direction into the food processor chamber during a tamping operation without interference from an S-shaped food processor cutting blade attached to the post.

6. The tool of claim 1, wherein the circle segment shape of the plate encompasses an angle of between 140° and 170°.

7. The tool of claim 1, wherein said bottom tamping surface is a flat planar surface.

8. The tool of claim 1, wherein said connection location is closer to said arcuate recess than to said outer scraping edge and is positioned in radial alignment with angular centers of arcs subtended by the arcuate recess and outer scraping edge.

9. The tool of claim 8,
    wherein the connection between said handle and said plate includes a plurality of mortise holes defined therethrough at said connection location, each mortise hole having a polygonal boundary wall; and
    wherein said handle has a distal end from which a like plurality of tenon projections extend, said tenon projections having polygonal peripheries matching the boundary walls of said mortise holes to provide a tight fit engagement of the tenon projections in the mortise holes.

10. A tamping and scraping tool for use in manipulating food materials in a food processor chamber, said tool comprising:
    a scraper plate having a shape of a segment of a circle, said plate comprising a flat planar bottom tamping surface for tamping down food materials and an inner beveled scraping edge configured as a substantially straight chordal line centrally interrupted by an arcuate recess with a small radius of curvature, said inner edge forming a chord of said circle segment;
    an outer arcuate beveled scraping edge with a larger radius of curvature, said outer edge forming an arc of said circle segment; and
    a handle in perpendicular orientation from a top surface of the plate at a connection location spaced radially outward from the arcuate recess and inward of the outer arcuate edge,
    wherein said arcuate recess and said arcuate outer edge are parts of respective concentric circles defined about a center point which resides on a central longitudinal axis of said food processor chamber when the tool is in use.

11. The tool of claim 10, wherein the circle segment shape of the plate encompasses an angle of between 140° and 170°.

12. The tool of claim 10, wherein the tool handle includes a widened bend at a proximal end serving as a large surface grip to facilitate turning and pulling of the tool and to resist rotation of the handle in a user's hand during rotational scraping.

13. The tool of claim 12, wherein said connection location is closer to said arcuate recess than to said outer scraping edge and is positioned in radial alignment with angular centers of arcs subtended by the arcuate recess and outer scraping edge.

14. The tool of claim 13,
    wherein the connection between said handle and said plate includes a plurality of mortise holes defined therethrough at said connection location, each mortise hole having a polygonal boundary wall; and
    wherein said handle has a distal end from which a like plurality of tenon projections extend, said tenon projections having polygonal peripheries matching the boundary walls of said mortise holes to provide a tight fit engagement of the tenon projections in the mortise holes.

15. A tamping and scraping tool for use in manipulating food materials in a food processor chamber having a central longitudinal axis, said tool comprising:
    a scraper plate shaped as a segment of a circle, said circle segment having a circular arc and a chord extending between end points of said arc; and
    an elongated handle;
        wherein said plate includes a flat planar bottom tamping surface for tamping down food materials and an inner scraping edge configured as a substantially straight line coincident with the chord of said circle segment,
        wherein said inner scraping edge is centrally interrupted by an arcuate recess with a small radius of curvature about the central longitudinal axis of the food processor chamber, said recess dividing said inner edge into two spaced co-linear edge sections of substantially equal length;

wherein said plate further includes an outer arcuate scraping edge with a larger radius of curvature about the central axis of the food processor chamber, said outer scraping edge being coincident with the arc of said circle segment; and wherein said handle is joined in substantially perpendicular orientation to the plate at a connection location spaced radially outward from the arcuate recess and inward of the outer arcuate edge.

16. The tool of claim 15, wherein the food processor chamber has an axially centered cylindrical post with an arcuate outer surface and a cylindrical sidewall with an arcuate interior surface, and wherein said arcuate recess in the inner edge of the plate is contoured to match the arcuate outer surface of the post and said outer arcuate scraping edge is contoured to match the arcuate interior surface of the sidewall to provide lateral stabilization of said plate when the tool is in use.

17. The tool of claim 16, wherein the two sections of said inner scraping edge taper in thickness towards the bottom surface of said plate to permit food materials in the chamber to be scraped from a bottom wall of the chamber with rotation of said plate about the axis of the post in either rotational direction, and wherein said outer arcuate scraping edge tapers in thickness towards the bottom surface of said plate in a radially outward direction to permit food materials in the chamber to be scraped from the interior surface of the sidewall during axially proximal and distal strokes of the tool.

* * * * *